3,645,889
ISOLATION OF n-PARAFFINS FROM MIXED BRANCH AND STRAIGHT CHAIN HYDROCARBONS
Donald O. Hanson, Bartlesville, Okla., assignor to Phillips Petroleum Company
Filed Dec. 29, 1969, Ser. No. 888,230
Int. Cl. C07b 21/00
U.S. Cl. 208—308                         6 Claims

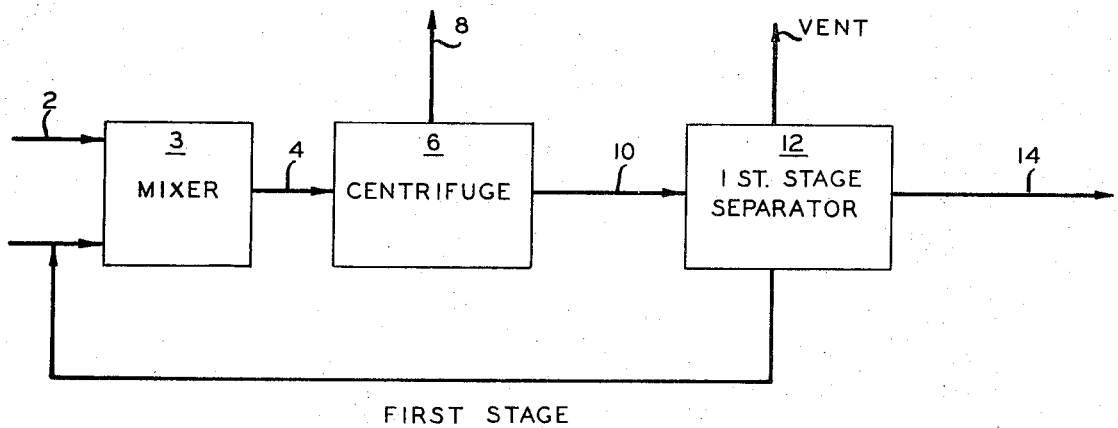
FIRST STAGE
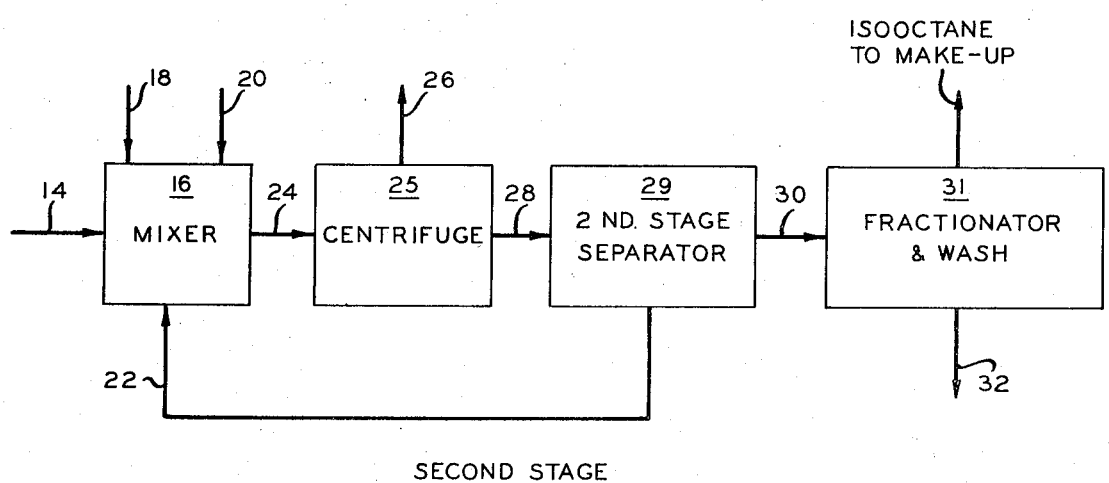
SECOND STAGE
INVENTOR.
D. O. HANSON
BY *Young & Quigg*
ATTORNEYS

United States Patent Office 3,645,889
Patented Feb. 29, 1972

ABSTRACT OF THE DISCLOSURE

A high purity n-paraffin stream is efficiently achieved by admixing the partially enriched n-paraffin stream from a first urea adduction stage with a low boiling solvent-diluent, re-adducting, then recovering an enriched n-paraffin stream in which the major portion of the occluded impurity is the easily separable low boiling solvent-diluent.

---

This invention relates to the isolation of high purity n-paraffins from a mixture of branched and straight chain hydrocarbons.

The urea process for selectively adducting straight chain hydrocarbons is known in the art. The straight chain hydrocarbons are separated according to the prior art, U.S. 3,448,040, by the formation and subsequent decomposition of the urea hydrocarbon adduct, for example, in the presence of a sulfolane compound.

The prior art in order to reach a n-paraffin purity of above 95 percent by volume would require a plurality of adduction, settling and separation stages. The second and subsequent stages are required for the further enrichment of the n-paraffins from about 80 percent by volume to at least 95 percent by volume purity. The poor results of the secondary stages are due to a lack of efficiency found in separating the occluded branched chain hydrocarbons which remain in the n-paraffin adduct.

It is an object of this invention to provide an improved process for the isolation of high purity n-paraffins from a mixture of branched and straight chain hydrocarbons.

I have discovered an improved process for isolating a high purity n-paraffin stream from an admixture of branched and straight chain hydrocarbons. My invention utilizes a two-stage urea adduction process with improvements which enhance the efficiency of separating the occluded branched chains from the straight chain adduct. The use of a low boiling diluent throughout the secondary stage provides a heretofore unachievable second stage n-paraffin purity.

The art can only achieve an approximate purity of 80 weight percent n-paraffins through the use of a one-stage urea adduction process. Either multiple washings and filterings, or multiple adduction stages are required to remove the occluded branched chain hydrocarbons. The art, by mixing a branched chain and straight chain hydrocarbon stream with urea dissolved in a solvent results in the formation of crystalline adducts in which the linear n-paraffin molecules are held within a tunnel-like structure. But branched chain hydrocarbons are also occluded by the sponge-like outer structure of the crystalline adducts and are most difficult to remove. Centrifuging and phase-to-phase separations are helpful but do not efficiently remove the occluded branched chain hydrocarbons which consist primarily of isoparaffins. Another method used by the industry to separate the n-paraffins from isoparaffins and other branched chain hydrocarbons has been through the use of molecular sieve processes. Economic considerations of the molecular sieve processes and the recovery efficiency of the n-paraffins continues to leave a burden upon the industry in purifying n-paraffins to a purity of greater than 95 percent by volume.

The limitations of the prior art can be overcome by mixing the partially enriched n-paraffin stream from the first urea adduction stage with a low boiling solvent-diluent, re-adducting, then recovering an enriched n-paraffin stream in which the major portion of the impurity is the low boiling solvent-diluent. The solvent-diluent dilutes the occluded branched chain paraffins in the second stage adduct, allowing a high purity n-paraffin stream realization upon separation of the diluent by fractionation.

After formation of the urea adduct, the adduct can be separated from the reaction mixture by suitable methods, for example centrifuging. Some unreacted components of the feed mixture remain occluded to the adduct after the separation method and it is essential to remove these components in order to achieve a high n-paraffin purity.

According to the invention, a suitable low boiling diluent, for example isooctane, is incorporated into the feed of the second adduction stage which serves to dilute the branched chain hydrocarbons, for example isoparaffins, in the material occluded by the adduct. Other examples of suitable low boiling diluents are isoheptane, isohexane, and isononane as well as butane or pentane since they do not adduct. The suitable low boiling diluent is a solvent for the branched chain hydrocarbons in the feedstream but is not reactive with the urea. The suitable low boiling solvent-diluent is present throughout the second urea adduction stage thereby holding in solution most of the nonnormal or branched chain hydrocarbons from the material which is occluded by the n-paraffin adduct. Simple fractionation separates the solvent-diluent and the n-paraffins producing a very high purity of about 98 percent by volume.

A hydrocarbon feedstream containing mostly carbon atom chain molecules in the kerosene range may be used in my invention. Preferably, a hydrocarbon feed of at least 10 carbon atoms per molecule in the kerosene range is used. N-paraffins of 10 to 14 carbon atoms per molecule have use in producing biodegenerable detergent alkylate required by modern water pollution controls.

A feedstream as discussed above and typified by a following example is introduced, for example, to a urea-sulfolane adduction process wherein the urea-sulfolane solution consists of about 23 weight percent urea and about 77 weight percent sulfolane. The hydrocarbon feedstream is contacted with the urea-sulfolane solution at about 90° F. under an approximate pressure of 15 to 100 p.s.i.a. for about 15 minutes to obtain reaction completion of the n-paraffins with urea and to precipitate solid adduct crystals. The contacting of the feedstreams is advantageously carried out in a colloid mill thereby greatly shortening the adducting period. The hydrocarbon feed to urea-sulfolane feed ratio is approximately 1:3 by volume. The urea-sulfolane adduct containing mostly n-paraffin is centrifuged and separated from the urea-sulfolane at approximately 170° F. and at about 15 to 100 p.s.i.a. The slurry is heated to decompose the adduct and produces a stream consisting of approximately 80 percent n-paraffins and 20 percent branched chain hydrocarbons comprised primarily of isoparaffins.

The partially enriched n-paraffins stream is then introduced to a second urea-sulfolane adduction process in the presence of isooctane at about 90° F. and approximately 15 to 50 p.s.i.a. A second adduct stage produced crystalline material is centrifuged at about 90° F. and approximately 15 to 50 p.s.i.a. before the centrifuged crystalline material is decomposed at about 170° F. and approximately 15 to 100 p.s.i.a. in order to separate the n-paraffins from recycle urea-sulfolane solution. The enriched n-paraffin stream containing isooctane in place of the branched chain hydrocarbons as part of the occluded material is then fractionated and washed thereby producing a 98 percent n-paraffin by volume purity.

Referring to the drawing, a stream of mixed branched chain and straight chain hydrocarbons 2 is fed into the urea-sulfolane mixer zone 3 wherein the straight chain hydrocarbons react with the urea in sulfolane solution to form solid adduct crystals which precipitate from solution. The slurry of solid adduct crystals in sulfolane and unreacted branched chain hydrocarbons 4 is passed to centrifuge 6 wherein the solid adduct crystals are separated from the liquid raffinate 8. The adduct crystals 10 from the centrifuge 6 are heated to 150–160° F. to decompose the adduct in decomposer 12 and yield a partially enriched n-paraffin stream 14 which is fed into the secondary stage urea-sulfolane mixer zone 16. Urea-sulfolane makeup 18, isooctane 20 and recycle urea-sulfolane 22 are also fed into the urea-sulfolane mixer zone 16. Total reaction effluent 24 is then centrifuged in centrifuge 25 to separate a liquid raffinate stream 26 and a solid adduct 28 which is heated and decomposed to yield high purity n-paraffins and recycle urea-sulfolane solution from the urea-sulfolane solution in separator 29. A paraffin extract 30 is then fractionated in fractionator tower 31 removing the low boiling isooctane yielding a stream 32 consisting of 98 percent pure n-paraffins by volume.

The drawing does not include equipment or process steps for each zone since the inclusion of such equipment and interim processes are understood by those skilled in the art and are within the scope of the invention.

EXAMPLE

A fresh feed of kerosene consisting of approximately 23.8 percent by weight n-paraffins and 76.2 percent by weight isoparaffins is introduced into the urea-sulfolane mixing zone as shown in the drawing. The feed is introduced at a rate of 211.80 bls./hr. as compared to a urea-sulfolane charge of 595.23 bls./hr. comprised of 23 percent by weight urea and 77 percent by weight sulfolane. The urea-sulfolane adduct formation zone requires a contact time of about 15 minutes and an approximate temperature of 90° F. under atmospheric pressure.

A partially enriched n-paraffin stream withdrawn from the urea-sulfone reaction zone is comprised approximately of 18.7 percent isoparaffins and 81.3 percent n-paraffins. The above stream is fed into the second urea-sulfolane mixing zone at a rate of 62.33 bls./hr. along with 550.51 bls./hr. of recycle urea-sulfolane, and 139.86 bls./hr. of isooctane. The second stage urea-sulfolane mixer is maintained at approximately 90° F. and atmospheric pressure. A total adduct slurry of 752.20 bls./hr. is centrifuged at about 90° F. and atmospheric pressure yielding a raffinate stream of 140.50 bls./hr. and a solid adduct of 605.62 bls./hr. The solid adduct is decomposed at approximately 170° F. and atmospheric pressure yielding a recycled urea-sulfolane stream of 550.51 bls./hr. and a paraffin extract of 55.41 bls./hr. The paraffin extract stream of 55.41 bls./hr. is fractionated and later washed yielding a 98 percent pure n-paraffin by volume stream of 47.72 bls./hr.

What I claim is:

1. A process for the isolation of high purity n-paraffins from a stream containing an admixture of branched chain and straight chain hydrocarbons, comprising the steps of: admixing the stream of branched and straight chain hydrocarbons with urea in the absence of a hydrocarbon diluent to selectively adduct said straight chain hydrocarbons; separating the non-adducted branched chain hydrocarbons from the urea adduct; decomposing the urea adduct; withdrawing a resulting partially enriched n-paraffin stream; admixing the partially enriched n-paraffin stream with urea in the presence of a solvent-diluent selected from the group consisting of isooctane, isoheptane, isohexane, isononane, butane, and pentane; separating the non-adducted branch chain hydrocarbons from the urea adduct; decomposing the urea adduct; wthdrawing an n-paraffin and occluded diluent stream; separating the n-paraffin and the solvent-diluent and recovering an enriched n-paraffin stream.

2. A process according to claim 1 wherein the feedstream is kerosene which contains branched and straight chain hydrocarbons of at least 8 carbon atoms per molecule.

3. A process according to claim 1 wherein the feedstream is kerosene containing branched and straight chain hydrocarbons ranging from 10 to 14 carbon atoms per molecule.

4. A process according to claim 1 wherein the low boiling solvent-diluent is isooctane.

5. A process according to claim 1 wherein both the first stage mixing steps and the second stage admixing step are accomplished by colloidal milling.

6. A process according to claim 1 wherein a kerosene feedstream of 10 to 14 carbon atoms per molecule is mixed with a urea-sulfolane solution in a colloid mill, the urea-sulfolane adduct is separated from non-adducted branched chain hydrocarbons by centrifuging, the urea-sulfolane adduct is decomposed by heating to about 170° F., a partially enriched n-paraffin stream from the first urea-sulfolane stage of at least 80 percent by volume n-paraffins is admixed in a colloidal mill with a urea-sulfolane solution in the presence of isooctane, the urea-sulfolane adduct is separated from non-adducted branched chain hydrocarbons by centrifuging, the urea-sulfolane adduct is decomposed by heating to about 170° F., withdrawing the n-paraffins and occluded octane stream, fractionating said n-paraffins and occluded isooctane and recovering an n-paraffin stream of at least 98 percent by volume purity.

References Cited

UNITED STATES PATENTS

| 2,588,602 | 3/1952 | Adams et al. | 260—676 |
| 2,763,637 | 9/1956 | McKay et al. | 260—96.5 |
| 2,861,941 | 11/1958 | Jancosek et al. | 260—96.5 |
| 3,448,040 | 6/1969 | Little et al. | 208—308 |

HERBERT LEVINE, Primary Examiner

U.S. Cl. X.R.

260—96.5 C